United States Patent Office 3,010,984
Patented Nov. 28, 1961

3,010,984
PROCESS FOR THE PRODUCTION OF ALKYL ALUMINUM SESQUICHLORIDES
Heinrich Weber, Franz-Peter van de Kamp, and Hanns Strache, all of Marl, Kreis Recklinghausen, Germany, assignors to Chemische Werke Huls Aktiengesellschaft, Marl, Kreis Recklinghausen, Germany, a corporation of Germany
No Drawing. Filed May 25, 1959, Ser. No. 815,296
Claims priority, application Germany Oct. 24, 1958
2 Claims. (Cl. 260—448)

This invention relates to a process for the production of alkyl aluminum sesquichlorides by reacting metallic aluminum with gaseous alkyl chlorides at low pressure in which the aluminum present in the reaction mixture is replenished with fresh aluminum before it is completely consumed and in which the freshly supplied aluminum is activated.

The activation of the metallic aluminum is effected by means of substances which are known for this purpose, such as mercury, mercury compounds, bromine and iodine, and by treatment with alkyl bromides or iodides. It is particularly advantageous to use methyl and ethyl bromides and iodides and elementary bromine and iodine. It suffices to use these substances in quantities of from 0.001 to 1, preferably 0.01 to 0.1 molar percent, referred to metallic aluminum treated. The small amount of bromine or iodine which thus gets into the alkyl aluminum sesquichloride is usually of no importance in subsequent use thereof, so that separation is not necessary.

As alkyl chlorides there are used preferably methyl chloride and ethyl chloride. As metallic aluminum one uses preferably aluminum powder, but also aluminum chips, aluminum granules, or aluminum grit may be used. The reaction is carried out at a temperature between 0 and 120° C., preferably between 40 and 80° C. At the start of the reaction the mixture must be brought to this temperature. As the reaction is highly exothermic, the desired temperature is then maintained by cooling. It may be advantageous to perform the reaction in the presence of an inert diluent. Suitable diluents are for example aliphatic and cycloaliphatic saturated hydrocarbons, such as hexane, cyclohexane, and isopropyl cyclohexane, which are used in amounts of from 10 to 200%, referred to the alkyl aluminum sesquichloride formed. By low pressure is understood preferably atmospheric pressure but when using a diluent which has a low boiling point, a slight excess pressure is advisable. This, however, need as a rule not be more than about 5 atmospheres. Also when working without diluents a slight excess pressure up to about 0.5 atmosphere is advisable to prevent air from getting into the apparatus. If desired, a reaction tower with the aluminum stationary therein may be employed, but a tank with stirrer is more advantageous, the entire reaction mixture being set in motion.

After the aluminum has been activated with mercury, mercury compounds, or iodine, for example, or by treating it with an alkyl bromide, such as methyl bromide or ethyl bromide, at a temperature between 0 and 120° C., one introduces the alkyl chloride into the reaction mixture in such an amount that only about 50 to 99%, preferably 80 to 95%, of the metallic aluminum is consumed. Then one can draw off the formed alkyl aluminum sesquichloride, if desired after interruption of the alkyl chloride supply and settling of the aluminum. Advantageously one draws off only such an amount of alkyl aluminum sesquichloride that the remaining aluminum still forms a stirrable mixture with the remaining sesquichloride even after the addition of the fresh aluminum. Together with the fresh aluminum or continuously or in portions one adds the compound of bromine or iodine and/or elemental bromine and/or of iodine in the stated quantity. The reaction then proceeds upon the further introduction of gaseous alkyl chloride even at temperatures much below 80° C., directly and without any delay. The reaction is then allowed to continue until the aluminum freshly brought into the reaction mixture is consumed, but with a quantity corresponding to the originally present aluminum still unconsumed. The formed alkyl aluminum sesquichloride is then drawn off as described above. These operations can be repeated as often as desired.

With the same success one can add the metallic aluminum and the compound of bromine or iodine and/or elemental bromine and/or iodine continuously during the reaction, while one draws off the formed alkyl aluminum sesquichloride in the same manner, separating it from suspended metallic aluminum, which then together with the fresh aluminum is returned to the process. This procedure, however, generally offers no special advantages, particularly since the continuous feeding of metallic aluminum requires considerable expense for apparatus in view of the spontaneous flammability of the alkyl aluminum sesquichlorides.

The activation of the freshly supplied aluminum renders it possible to carry out the reaction with gaseous alkyl chlorides at lower temperatures than according to the process heretofore employed. Consequently one obtains alkyl aluminum sesquichlorides which are free from disturbing contaminations by compounds of higher halogen contents.

*Example*

Into a reaction vessel holding 150 liters, under nitrogen as protective gas, 35 kg. of ethyl aluminum sesquichloride and 27 kg. of aluminum powder are charged. 10 g. of iodine and 1 kg. of ethyl bromide are added, and the closed vessel is heated slowly to 70° C. with agitation. Then, from an open container but protected from the atmosphere by immersion, the introduction of the ethyl chloride is begun, the temperature being maintained at 80–90° C. by cooling. Of the ethyl chloride, which reacts completely, 90% of the amount theoretically required for 27 kg. of aluminum, that is, 87 kg., are introduced, and then agitation is discontinued. There remain unreacted in the vessel about 10% of the charged 27 kg. of aluminum, or about 2.7 kg. After cooling, the aluminum is allowed to settle and the formed ethyl aluminum sesquichloride is separated.

Again 27 kg. of aluminum, 50 g. of ethyl bromide, and 10 g. of iodine are introduced into the vessel, heated to 55° C., ethyl chloride is introduced and the temperature is maintained at 55° C. by cooling. A lively reaction sets in. Ethyl chloride in the amount calculated for 27 kg. of aluminum (96.8 kg.) is introduced. After the cooling and settling of the aluminum, the ethyl aluminum sesquichloride formed with a yield of more than 98% (122 kg.) is separated. When using pure aluminum, the above described operation can be repeated practically any desired number of times.

We claim:

1. Process for the production of alkyl aluminium sesquichlorides which comprises reacting aluminium activated with a member selected from the group consisting of alkyl bromides, alkyl iodides, bromine and iodine in an amount within the range from 0.001 to 0.1 molar percent based upon the amount of aluminium, under the exclusion of air and in the presence of aluminium sesquichloride with an alkylchloride at a pressure not exceeding about 5 atmospheres and at a temperature within the range from 0° to 80° C., replenishing the aluminium present in the reaction mixture before it is completely consumed with additional aluminum activated as aforesaid and separating the alkyl aluminium sesquichloride formed from the unreacted aluminium.

2. Process as defined in claim 1 in which the reaction is carried out in the presence of an inert diluent.

References Cited in the file of this patent

UNITED STATES PATENTS

| | | |
|---|---|---|
| 2,852,544 | Nowlin et al. | Sept. 16, 1958 |
| 2,863,894 | Smith | Dec. 9, 1958 |

FOREIGN PATENTS

| | | |
|---|---|---|
| 196,416 | Austria | Mar. 25, 1958 |